(12) United States Patent
Raschke (10) Patent No.: US 9,677,917 B2
(45) Date of Patent: Jun. 13, 2017

(54) HOUSING AND HOUSING PART FOR A HOUSING OF A SENSOR FOR A VEHICLE TRANSMISSION; SENSOR FOR A VEHICLE TRANSMISSION; AND METHOD FOR THE PRODUCTION OF A SENSOR FOR A VEHICLE TRANSMISSION

(75) Inventor: Dirk Raschke, Auerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 379 days.

(21) Appl. No.: 14/240,763

(22) PCT Filed: Jul. 23, 2012

(86) PCT No.: PCT/EP2012/064400
§ 371 (c)(1),
(2), (4) Date: Feb. 25, 2014

(87) PCT Pub. No.: WO2013/029873
PCT Pub. Date: Mar. 7, 2013

(65) Prior Publication Data
US 2015/0219478 A1 Aug. 6, 2015

(30) Foreign Application Priority Data
Aug. 26, 2011 (DE) .................. 10 2011 081 638

(51) Int. Cl.
*G01D 11/24* (2006.01)
*B32B 37/04* (2006.01)
(Continued)

(52) U.S. Cl.
CPC ............ *G01D 11/245* (2013.01); *B32B 37/04* (2013.01); *B32B 38/0008* (2013.01); *G01B 21/16* (2013.01); *B29C 65/1435* (2013.01); *B29C 65/1635* (2013.01); *B29C 66/112* (2013.01); *B29C 66/114* (2013.01); *B29C 66/54* (2013.01); *B29C 66/71* (2013.01);
(Continued)

(58) Field of Classification Search
CPC ....................................................... B29C 65/16
USPC ............................................................. 73/431
See application file for complete search history.

(56) References Cited

U.S. PATENT DOCUMENTS

2005/0217627 A1 * 10/2005 Daly ................ F02M 35/10039
123/184.61
2007/0007259 A1 1/2007 Mikhailov
(Continued)

FOREIGN PATENT DOCUMENTS

DE EP 1059506 A2 * 12/2000 ............. G01D 5/145
DE 102007021268 A1 * 11/2008
(Continued)

OTHER PUBLICATIONS

German Patent Office Search Report, Oct. 1, 2012.
PCT Search Report and Written Opinion, Mar. 13, 2013.

*Primary Examiner* — Lisa Caputo
*Assistant Examiner* — Jamel Williams
(74) *Attorney, Agent, or Firm* — Dority & Manning, P.A.

(57) ABSTRACT

A housing part for a sensor for a vehicle transmission is able to be connected at the sensor housing to an additional housing part along a joining area by means of a joining process. The housing part has at least one uniform wall thickness or adjusted optical material properties in the joining area.

10 Claims, 3 Drawing Sheets

(51) Int. Cl.
  *B32B 38/00* (2006.01)
  *G01B 21/16* (2006.01)
  *B29L 31/34* (2006.01)
  *B29C 65/16* (2006.01)
  *B29C 65/00* (2006.01)
  *B29C 65/14* (2006.01)

(52) U.S. Cl.
  CPC . *B29C 66/73921* (2013.01); *B29L 2031/3481* (2013.01); *B32B 2307/20* (2013.01); *B32B 2310/0843* (2013.01); *B32B 2605/08* (2013.01)

(56) References Cited

U.S. PATENT DOCUMENTS

| | | |
|---|---|---|
| 2008/0150519 A1 | 6/2008 | Hoeller et al. |
| 2009/0065137 A1* | 3/2009 | Okui ................. B29C 65/1635 156/272.8 |
| 2010/0126305 A1 | 5/2010 | Klippert |
| 2010/0136818 A1 | 6/2010 | Bermel et al. |
| 2011/0162223 A1* | 7/2011 | Ellin ................. G01D 5/34707 33/706 |
| 2011/0185812 A1 | 8/2011 | Raschke |
| 2014/0208878 A1* | 7/2014 | Raschke ................ G01D 11/30 73/866.5 |

FOREIGN PATENT DOCUMENTS

| | | | | |
|---|---|---|---|---|
| DE | 10 2009 002005 | | 10/2010 | |
| DE | 102010001493 | * | 8/2011 | ......... B29C 65/7835 |

* cited by examiner

HOUSING AND HOUSING PART FOR A HOUSING OF A SENSOR FOR A VEHICLE TRANSMISSION; SENSOR FOR A VEHICLE TRANSMISSION; AND METHOD FOR THE PRODUCTION OF A SENSOR FOR A VEHICLE TRANSMISSION

FIELD OF THE INVENTION

This invention relates to a housing and a housing part for a housing of a sensor for a vehicle transmission, to a sensor for a vehicle transmission and to a method for the production of a sensor for a vehicle transmission.

BACKGROUND

A housing of a sensor, in particular a position sensor for a vehicle transmission, typically consists of two components and/or housing parts, which are tightly connected to each other, in order to create a sealed area for at least one element of the sensor.

DE 10 2009 002 005 A1 discloses a position sensor for detecting a position of an element, in particular of a transmission element.

SUMMARY OF THE INVENTION

Against this backdrop, this invention creates an improved housing and housing part for a sensor, an improved housing for a sensor for a vehicle transmission, an improved sensor for a vehicle transmission, along with an improved method for the production of a sensor for a vehicle transmission. Advantageous arrangements arise from the following description. Additional objects and advantages of the invention will be set forth in part in the following description, or may be obvious from the description, or may be learned through practice of the invention.

This invention is based on the understanding that a housing part for a housing of a sensor for a vehicle transmission in a section of the housing part comprising a joining area, along which the housing part is able to be connected at the housing to an additional housing part by means of a joining process, in particular a transmission welding process, is able to be designed in such a manner that a constant or unvarying radiation generated during the joining process is able to be emitted along the section with constant or unvarying radiation intensity. In other words, the housing part to designed in such a manner that the constant or unvarying radiation used in the joining process and penetrating the housing part for the connection of the housing part with the additional housing part at the housing, with a constant or unvarying radiation intensity at the side of the joining area of the housing part, to which the additional housing part is able to be connected to the housing part at the housing, is able to leak or be transmitted. This may occur preferably through influencing the optical material properties, such as through the transmission, absorption or reflection of the material used for the section comprising the joining area, and/or preferably through forming the section comprising the joining area with a uniform or unvarying wall thickness or material thickness.

By means of influencing the optical properties, in accordance with a preferred embodiment of this invention, a housing part is provided, which has a joining area, that includes at least two areas with wall thicknesses that are different from each other, whereas a connection to an additional housing part is able to be reliably carried out at a housing without the influences of the wall thickness being able to negatively affect the joining connection. Thus, housing parts with varying surface contours and thicknesses may be provided in the section for a housing comprising the joining area. This is because, through a suitable selection of materials under consideration of at least the transmission, reflection or absorption properties of the material for the section comprising the two areas with varying wall thicknesses, the delivery of a constant or unvarying radiation intensity may be realized along the section comprising the at least two areas, at the side of the joining area of the housing part. For example, for a first joining area with a wall thickness or a material thickness, a material may be used that, under the adjustment of the absorption and/or reflection properties, has transmission properties that are lower than that of the material that is used for a second joining area with a wall thickness or a material thickness that is greater than the wall thickness of the first joining area. Since the sum from the transmission, absorption and reflection of a material that is able to be acted upon with radiation generally results in 100%, for each joining area, preferably featuring different wall thicknesses, depending on the desired radiation intensity, a suitable material can be determined by means of the adjustment of the optical properties of the same in order to achieve a constant or unvarying radiation intensity that is able to be emitted or able to leak or able to be transmitted along the section comprising the joining area. For example, plastics such as thermoplastics and thermoplastic elastomers sufficiently known to specialists in joining processes, such as, preferably, the transmission welding process, are possible as suitable materials. As is known with such materials, the transmission, absorption or reflection properties may be adjusted, and correspondingly determined, through the admixture of additives and/or strengthening substances.

With the aforementioned second preferred embodiment, a housing part may be provided, which may be designed, at least in the section comprising the joining area, with a uniform or unvarying wall thickness or material thickness. Thus, in the joining area, the thickness of the housing part is uniform, which has advantageous effects, for example, in the joining process, and by which the housing part may be able to be produced simply and cost-effectively. Generally stated, at least one dimension and, in addition or as an alternative, one transmission property of the housing part is uniform, for example in the joining area of the housing part. "Uniform" may be understood such that, for example based on the material tolerances and/or production tolerances of the housing parts forming the housing along with the performance tolerances of the joining device used in the joining process for the connection of the housing parts to the housing, minor deviations may exist along the joining area and/or the joining connection.

Based on the aforementioned measures, the joining procedure or the joining process for connecting the housing part with the additional housing part in the joining area may be designed in a uniform, reliable and tight manner. In particular, limited deviations of quality regarding a connection achievable in the joining procedure may be avoided through material irregularities, variations in wall thickness and the like. The quality, density, uniformity and sturdiness of the joints may be increased by a design of the housing part in accordance with the embodiments of this invention.

In a preferred embodiment of the housing part, the housing part forms an element of a sensor housing, further preferably for a vehicle transmission.

The vehicle may be a motor vehicle, such as a passenger car, truck, or a commercial vehicle, with a manual transmission. The transmission may be a direct shift gearbox or an automatic transmission. The sensor may be a position sensor or a distance sensor or the like. Thereby, the sensor may be designed as a magnetic field sensor. At least one sensor element of the sensor is arranged in the assembled state of the sensor within the housing. The housing is thereby designed, for example, in two parts. In particular, the housing is formed from a housing part and an additional housing part. The housing part and the additional housing part may be connected to each other to form the housing. The housing may be a housing half, a housing shell or a housing half-shell, a housing plate or the like. The housing part is designed to be connected to the additional housing part by means of a joining process, preferably by means of a transmission welding process. By means of the joining process, for example, a firmly bonded connection between the housing part and the additional housing part may be produced. In particular, by means of the joining process, a connection between the additional housing part and the housing part in the joining area and/or along the joining area of the housing part may be produced. Thus, a connection between a joining surface of the housing part in the joining area and an additional joining surface of the additional housing part may be produced by means of the joining process.

The joining area of the housing part has, for example, a section of a wall of the housing part. Thus, the joining area may extend from the joining surface of the housing part, through a wall bounded by the joining surface, up to a surface turned away from the joining surface and bounding the wall. Thus, the joining area may have a thickness that corresponds to the thickness of the wall. Thereby, one form of the joining area may have a filled or unfilled base area with an outline, which corresponds to a form of the additional joining surface of the additional housing part. For example, the form of the joining area may thus be circular, rectangular, or ring-shaped. By means of the aforementioned measures, thus the adjustment of the optical properties or, in addition or as an alternative, the uniform wall thickness, it can be ensured that the housing is penetrated along the joining area by a constant proportion of the radiation striking the housing part. The constant proportion of the radiation penetrating the housing is available for the joining procedure. Thus, the housing may have a constant permeability for the radiation along the joining area. In other words, it can be ensured through the constant transmission factor that, along the joining area, a constant proportion of the radiation striking the housing is reflected and/or absorbed, and is thus not available for the joining procedure. The housing parts may be made of plastic and may be designed, for example, as plastic injection parts.

Thereby, the housing part may be designed for transmitting the radiation used in the joining process. So, for example, the joining process may feature a laser-based process, in particular a laser welding process. Thus, the radiation that is used may be, for example, electromagnetic radiation, in particular laser beams or laser light. The housing part is designed for letting through and/or transmitting the radiation. In other words, the housing part is designed to not absorb the radiation, or to absorb the radiation at a negligible or a predetermined proportion. Such a housing part designed to be transmitting offers the advantage that it may be connected to the additional housing part in a simple and sturdy manner. Thereby, the joining process may be carried out through the housing part, whereas the housing part and the additional housing part may already be arranged against each other. Thus, a complex connection geometry along with a large-area connection with uniform quality may be realized.

Thus, the housing part may have a uniform wall thickness along the entire joining area. Thus, a material from which the housing part is formed may have an unvarying thickness along the joining area. Such an embodiment offers the advantage that, in a simple manner, the emission of a constant radiation intensity may be realized along the joining area. Thereby, a uniformly high quality of connection in the joining process may be achieved.

In accordance with an additional embodiment of this invention, at least one guide section and one guide rib for guiding a movable sensor element may be arranged on a planar surface of the housing part. Thereby, the at least one guide section and the guide rib may have a common main extension direction. Thereby, the guide rib may extend beyond a section of the joining area, and may be broken off in the section. In particular, two opposing guide sections and a guide rib arranged between the guide sections for guiding a movable sensor element may be arranged on a planar surface of the housing part, whereas the guide sections and the guide rib have a common main extension direction. Thereby, the housing part may have a plate-shaped section, in which the planar surface is arranged. At least one guide section is arranged in an edge area of the planar surface. In particular, a first guide section may be arranged in a first edge area of the planar surface, and a second guide section may be arranged in a second edge area of the planar surface opposing the first edge area. At least one guide section may be a guide groove, a guide rail or the like. In addition, a guide rib, which may be formed, for example, as an elongated curvature of the otherwise planar surface, may extend across the planar surface. Thereby, the guide rib may have a main extension direction, which corresponds to a main extension direction of at least one guide section. Thus, the at least one guide section and the guide rib may essentially extend parallel to the planar surface. Thereby, the at least one guide section and the guide rib are designed to guide, or receive in a moving manner, a movable sensor element or a slide or the like, which holds the movable sensor element, along the movement path, whereas the movement path may be defined by a length of at least one guide section and/or the guide rib. In particular, the at least one guide section and the guide rib may be designed to guide a magnetic slide. In doing so, the guide rib may extend beyond at least one section of the joining area, for example touching, traversing or crossing (or the like) at least one section of the joining area. In the section of the joining area, which is (for example) touched, traversed or crossed by the guide rib, the guide rib is broken off. Thus, the planar surface in the section of the joining area, for example, does not have a curvature for forming the guide rib. The guide rib has a recess in the section of the joining area, whereas the guide rib in the section can be lowered to a level of the planar surface. Thus, at each intersection of the guide rib with the joining area, the guide rib may have a gap. Such an embodiment offers the advantage that a connection to the additional housing part that is both uniformly reliable and sturdy is enabled as an accurate and secure guide of a movable sensor element.

This invention also creates a housing for a sensor for a vehicle transmission, characterized in that the housing has a housing part specified above and an additional housing part that is arranged in a manner abutting the housing part at the joining area of the housing part, and that the housing part and the additional housing part enclose a receiving space for a stationary sensor element.

The receiving space may be a hollow space in the housing, which is formed when the additional housing part is arranged in a manner abutting the housing part at the joining area of the housing part. The receiving space may be formed by a bulge or the like of the additional housing part and, in addition or as an alternative, of the housing part. For example, the receiving space may be able to be closed by the housing part in the manner of a lid. The stationary sensor element may be a fixed-location sensor element, for example a stator or the like of the sensor. Thereby, the stationary sensor element may be designed to enable the detection of a position or a path of the movable sensor element. In conjunction with the housing, a housing part specified above may be advantageously used or deployed in order to enable a dense, uniform and sturdy connection at the housing of the housing part and the additional housing part.

Thereby, the housing part may be connected to the additional housing part along the joining area by means of a joining process. Moreover, the additional housing part may be designed to be absorbent for the radiation used in the joining process. The joining process may be, for example, a laser welding process or the like. The additional housing part may be designed to not transmit the radiation that is used, that is, for example, the laser light. Such an embodiment offers the advantage that the housing part and the additional housing part may be connected to the housing in a simple, efficient and reliable manner.

This invention also creates a sensor for a vehicle transmission, whereby the sensor has a stationary sensor element and a movable sensor element, characterized in that the sensor has a housing specified above, that the stationary sensor element is arranged in the receiving space enclosed by the housing part and the additional housing part, and that the movable sensor element is mounted in a movable manner on the housing part.

In conjunction with the sensor, a housing specified above may be advantageously used or deployed in order to protect one element of the sensor in the tightly closed receiving space and arrange an additional element of the sensor movably and exactly defined in terms of position.

In accordance with one embodiment, whereby the sensor has an electronic evaluation unit, the electronic evaluation unit may be arranged in the receiving space enclosed by the housing part and the additional housing part. Moreover, the additional housing part has an electrical contact device for the contact of the stationary sensor element and, in addition or as an alternative, the electronic evaluation unit outside of the additional housing part. Thereby, the electronic evaluation unit may be electrically connected to the electrical contact device and, if necessary, to the stationary sensor element. The stationary sensor element may be electrically connected to the electrical contact device independent of the electronic evaluation unit. The electrical contact device is designed to enable the supply of the electronic evaluation unit and/or the stationary sensor element with electricity from outside of the sensor or the housing, as the case may be, and a transfer of sensor information to outside of the sensor or the housing, as the case may be. Such an embodiment offers the advantage that the electronic evaluation unit of the sensor may be arranged and electrically contacted in a secure and protected manner.

This invention also creates a method for the production of a sensor for a vehicle transmission, characterized in that the method features a step of providing a housing part for a housing of the sensor, whereas the housing part is able to be connected at the housing to an additional housing part along a joining area by means of a joining process, in particular by means of a transmission welding process. The housing part is designed at least in one section comprising the joining area, to emit radiation used in the joining process with constant radiation intensity. The method includes a step of providing an additional housing part with a joining surface absorbing the radiation used in the joining process, and a step of mounting of a stationary sensor element and/or an electronic evaluation unit on the housing part or the additional housing part. A step is provided of arranging the housing part and the additional housing part against each other, whereas the additional housing part with the joining surface abuts the joining area of the housing part, whereas the housing part and the additional housing part enclose a receiving space for the stationary sensor element. A step is further provided of joining together of the housing part and the additional housing part at the joining area by means of the joining process and a step of the mounting of a movable sensor element on the housing part.

In conjunction with the method, a sensor specified above may be advantageously produced. By means of the method, it is preferable that the housing parts described above may be connected to a uniform, reliable and sturdy connection in order to create a tightly closed receiving space, in which the stationary sensor element and/or the electronic evaluation unit may be arranged in a protected manner.

In particular, the step of joining together may be carried out by means of laser welding. Thereby, the laser beams used in the laser welding may be transmitted from the housing part and absorbed by the additional housing part. Thus, a firmly bonded connection between the housing part and the additional housing part may be produced efficiently, uniformly, reliably and sturdily.

BRIEF DESCRIPTION OF THE DRAWINGS

The invention is more specifically illustrated as an example on the basis of the attached drawings. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the following description of the preferred embodiments of the present invention, elements shown in the various figures and elements having similar effects use the same or similar reference signs, whereas a repeated description of these elements is omitted.

Figure 1:
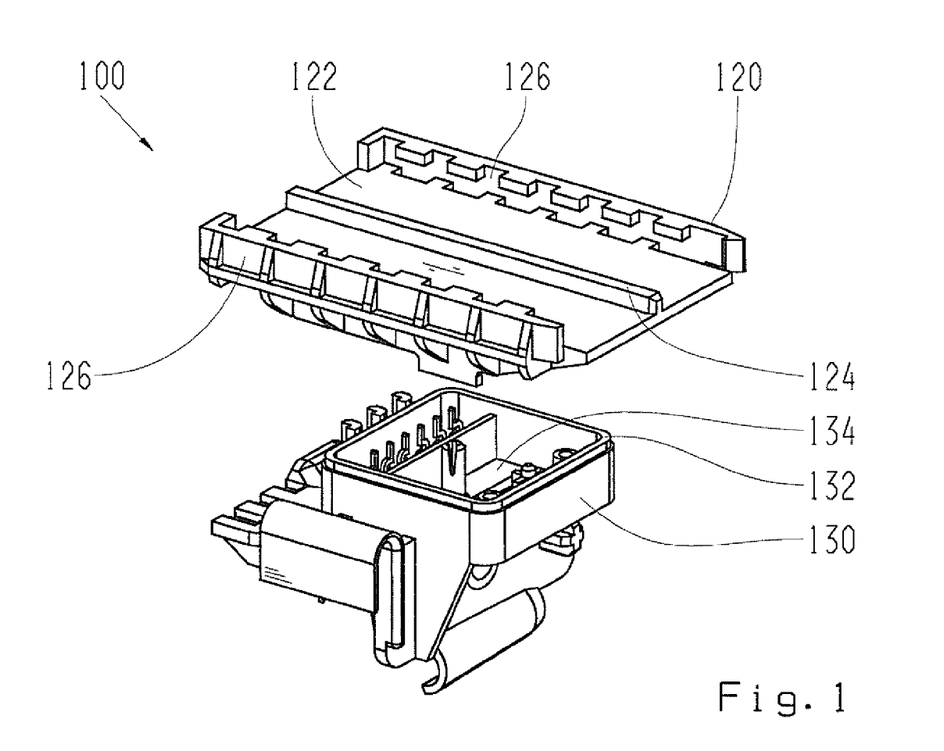
FIG. 1 is a housing of a sensor for a vehicle transmission.

FIG. 1 shows a housing 100 of a sensor for a vehicle transmission. The housing 100 has a housing part 120, which includes a planar surface side 122 with a continuous guide rib 124 and two opposing guide sections 126 for guiding a movable sensor element, along with an additional housing part 130, which includes a joining surface 132 and a receiving recess 134 for receiving a stationary sensor element. The housing part 120 and the additional housing part 130 may be joined together in order to complete the housing 100. Thereby, the joining surface 132 of the additional housing part 130 comes into contact with a corresponding joining surface (not shown) of the housing part 120, and the receiving recess 134 is closed by the housing part 120 at a receiving space.

Figure 2:
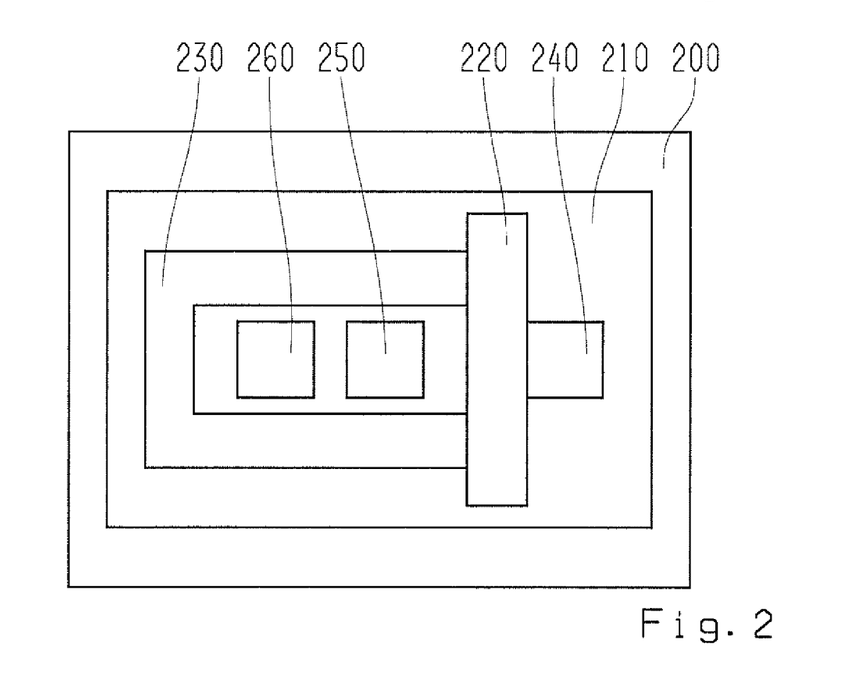
FIG. 2 is a schematic representation of a motor vehicle with a sensor for a vehicle transmission, in accordance with one embodiment of this invention.

FIG. 2 shows a schematic presentation of a vehicle 200 with a sensor 210 for a vehicle transmission, in accordance with one embodiment of this invention. The sensor 210 is formed by a housing and sensor elements. The housing of the sensor 210 has a housing part 220 and an additional housing part 230. The sensor elements of the sensor 210 have a movable sensor element 240, a stationary sensor element 250 and an electronic evaluation unit 260. The housing part 220 and the additional housing part 230 are joined together, whereas the same enclose a receiving space in which the stationary sensor element 250 and the electronic evaluation unit 260 of the sensor 210 are arranged.

The housing part 220 has a uniform wall thickness or a material thickness in a joining area in which the housing part 220 is joined together with the additional housing part 230. The housing part 220 and the additional housing part 230 may be joined, for example, by means of laser welding. Thereby, the housing part 220 may be designed to be transmitting for the laser light used in the laser welding. The additional housing part 230 may be designed to be absorbent for the laser light used in the laser welding.

The movable sensor element 240 is arranged on the surface of the housing part 220 turned away from the receiving space. Thereby, the movable sensor element 240 may be mounted to the housing part 220 in such a manner that a movement of the movable sensor element 240 along a movement path of the surface of the housing part 220 turned away from the receiving space is enabled. The moveable sensor element 240 may be, for example, a magnetic slide mounted in a movable manner in the housing part 220. The stationary element 250 may be, for example, a stator, which is designed to enable the detection of a position of the movable sensor element 240 and/or the magnetic slide. The movable sensor element 240 may also be connected to a transmission element, in particular a moving transmission element, of the vehicle 200.

Figure 3:
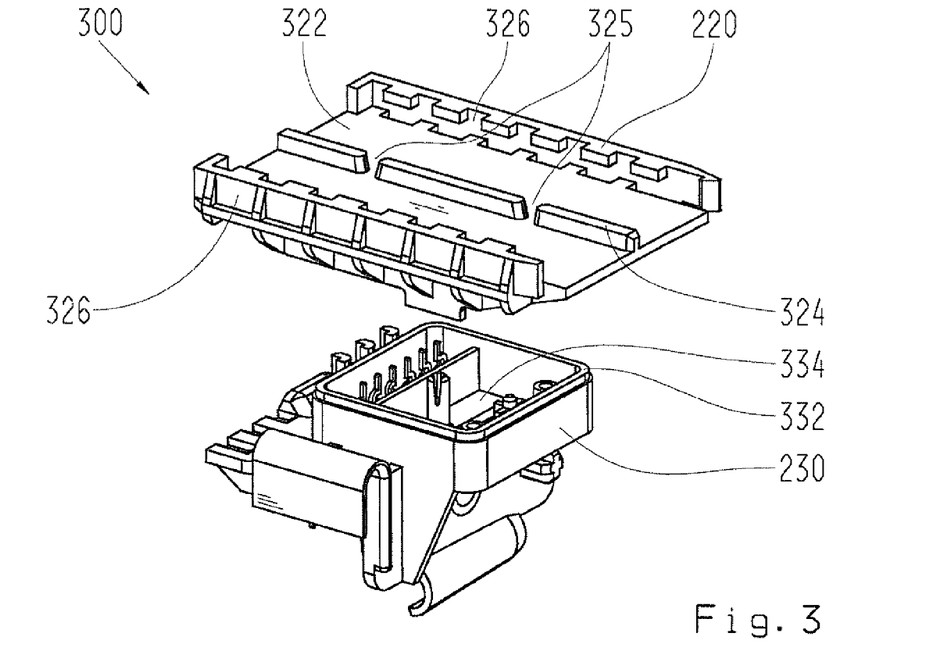
FIG. 3 is a housing of a sensor for a vehicle transmission, in accordance with one embodiment of this invention, in a state that is not joined together.

FIG. 3 shows a housing of a sensor for a vehicle transmission, in accordance with one embodiment of this invention, in a state that is not joined together. A housing part 220 and an additional housing part 230 form the housing 300. The housing part 220 and the additional housing part 230 may be the housing part and the additional housing part from FIG. 2. Thus, the housing part 220 may represent a first component of the housing 300, and the additional housing part 230 may represent a second component of the housing 300. The housing part 220 has a planar surface side 322 with a guide rib 324, two gaps 325 of the guide rib 324 and two guide sections 326 opposite to each other. The additional housing part 230 has a joining surface 332 and a receiving recess 334.

The housing part 220 is arranged in FIG. 3 above the additional housing part 230. The housing part 220 has a plate-shaped main body. The housing part 220 has the surface side 322 on the main surface of the plate-shaped main body. The surface side 322 is formed planar and/or plane or level. The surface side 322 and/or the plate-shaped main body of housing part 220 has, for example, a plan view that is essentially rectangular.

The guide rib 324 extends on the surface side 322 in a straight line from one end of the plate-shaped main body and/or the surface side 322 to one opposing end of the plate-shaped main body and/or the surface side 322. In particular, the guide rib 324 extends on the surface side 322 in a straight line from one narrow side edge of the plate-shaped main body to an opposing narrow side edge of the plate-shaped main body. The guide rib 324 is formed as an elongated projection or an elongated elevation with regard to the surface side 322. In accordance with the embodiment of this invention presented in FIG. 3, the guide rib 324 has three sections. In other words, the guide rib 324 has two gaps 325 and/or break points. In one area of the gaps 325, the height of the guide rib 324 amounts to zero, with respect to the surface side 322.

Figure 5:
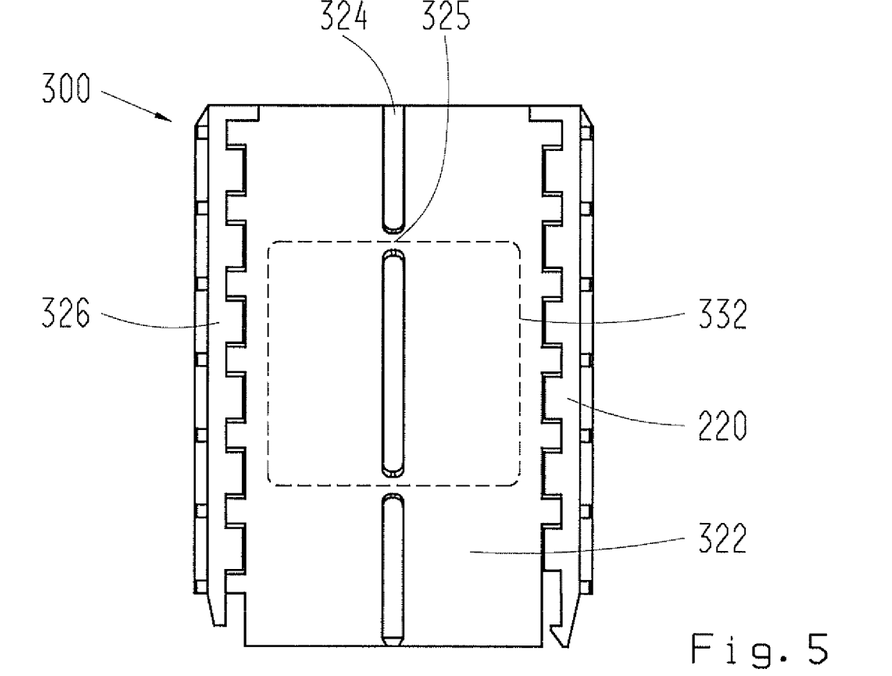
FIG. 5 is a top view of a housing of a sensor for a vehicle transmission in accordance with one embodiment of this invention.

The gaps 325 are arranged in a joining area of the housing part 220, which is not explicitly shown in FIG. 3. The joining area corresponds to a joining area of the main body of the housing part 220, which is turned away from the surface side 322, through the main body, up to the section of the housing part 220 extending on the surface side 322. Thus, the joining area extends over a total thickness or wall thickness of the main body of the housing part 220. The run and the shape, or contour, of the joining area correspond to the run and the shape, or contour, of joining area 332 of the additional housing part 230, as schematically shown in FIG. 5. Thus, the joining area thereby runs through the two gaps 325 in the guide rib 324. In accordance with this embodiment, a surface of the joining area turned away from the surface side 332 is continuously level. If, in the alternative, the surface side 332 has an uneven contour, the surface of the joining area turned away from the surface side 332 may likewise have the uneven contour of the surface side 332, so that the joining area, along its entire run, has a thickness consistently within normal tolerances. As an alternative, beforehand, the material for the housing part and/or the material forming the particular joining areas with different wall thicknesses are determined by means of the adjustment of the optical properties in such a manner that the surface of the entire joining area turned away from the surface side 332 may emit radiation with constant radiation intensity, which is used in the joining process.

The length of each of the gaps 325 may correspond to the width of the joining surface 332 or a joint to be created along the joining surface 332 or the diameter of a beam used in the joining process. For example, the length of each of the gaps 325 may correspond to the approximate width of the guide rib 324.

The two guide sections 326 are arranged in two opposing edge areas of the plate-shaped main body of the housing part 220. In particular, the two guide sections 326 extend along the opposing long side edges of the plate-shaped main body and/or the surface side 322 of the housing part 220. The guide sections 326 are guide rails for a movable sensor element, such as a magnetic slide of the sensor. The guide sections 326 are at least partially formed by undercuts. At one end, the guide sections 326 have a stop area for limiting the movement of the movable sensor element.

On the joining surface, which is turned away from the surface side 322 at the plate-shaped main body, the housing part 220 has at least one projection, which is arranged outside of the joining area. This at least one projection may be designed to bring about an improved alignment upon the joining together of the housing part 220 with the additional housing part 230.

In FIG. 3, the additional housing part is arranged below the housing part 220. In accordance with the embodiment shown in FIG. 3, the joining surface 332 presents a circumferential edge of the receiving recess 334. In accordance with the embodiment of this invention shown in FIG. 3, the joining surface 332 of the additional housing part 230 has a quadratic run with rounded corners.

The receiving recess 334 represents a bulge or a hollow space in the additional housing part 230. The receiving recess 334 is enclosed on all but one side by the additional housing part 230.

Figure 4:
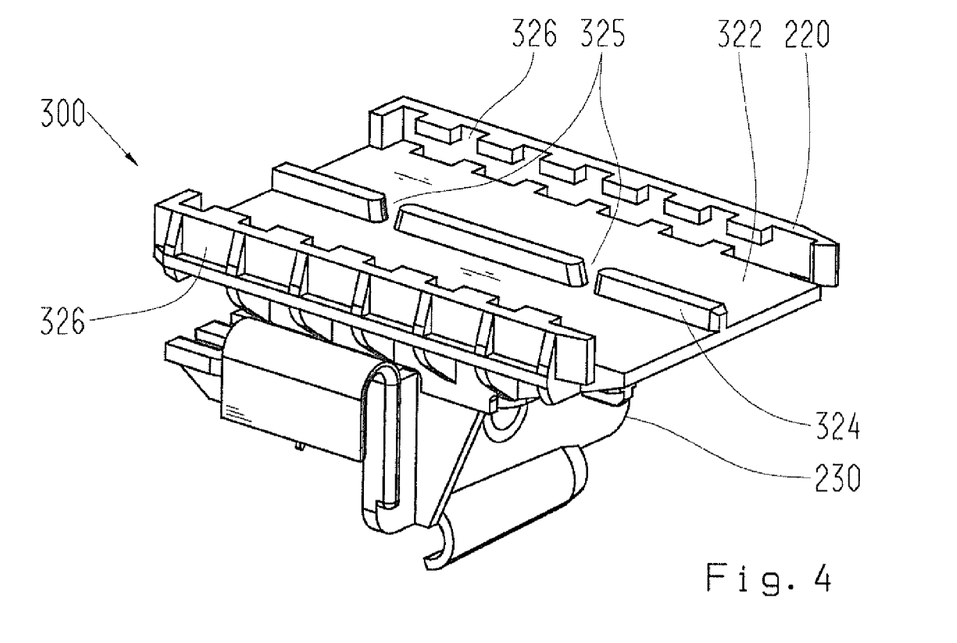
FIG. 4 is a housing of a sensor for a vehicle transmission, in accordance with one embodiment of this invention, in a state that is joined together.

FIG. 4 shows a housing 300 of a sensor for a vehicle transmission, in accordance with one embodiment of this invention, in a state that is joined together. Thereby, the housing 300 corresponds to the housing from FIG. 3, whereas the housing part 220 and the additional housing part 230 in FIG. 4 are joined together and/or are arranged in a manner abutting against each other. Thus, the display in FIG. 4 corresponds to the display from FIG. 3, with the exception that, due to the joined-together state of the housing part 220 and the additional housing part 230, the joining surface and the receiving recess of the additional housing part 230 are covered by the housing part 220 in the display. The housing part 220 and the additional housing part 230 may be, for example, connected to each other with a firmly bonded connection by means of a joining process, such as (for example) laser welding. Thereby, the housing part 220 may cover the receiving recess of the additional housing part 230, such as a cover, whereas a receiving space for a stationary sensor element and, in addition or as an alternative, and electronic evaluation unit of the sensor is formed.

Figure 6:
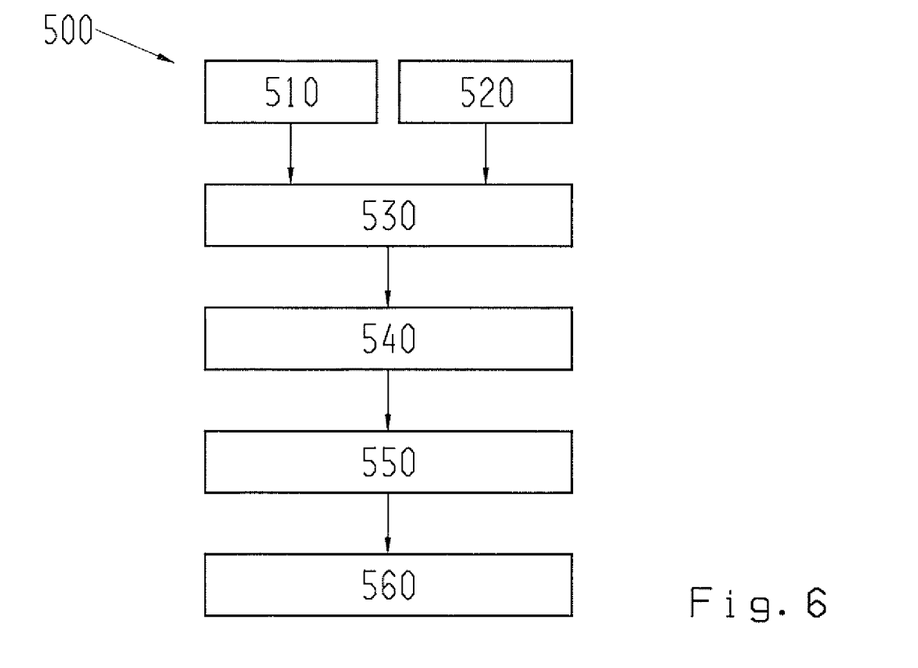
FIG. 6 is a flow chart of a method in accordance with one embodiment of this invention.

FIG. 6 shows a flow chart of a method 500 for the production of a sensor for a vehicle transmission, in accordance with one embodiment of this invention. The method 500 features a step 510 of providing a housing part for a housing of the sensor. Thereby, the housing part is able to be connected at the housing to an additional housing part along a joining area by means of a joining process. In addition, the housing part in the joining area has a uniform wall thickness within the framework of normal manufacturing tolerances of the housing part, for example an injection molding part. The method 500 also features a step 520 of providing an additional housing part. The housing part and the additional housing part may be the housing part and the additional housing part from one of the FIGS. 2 to 4. The method 500 features a step 530 of the mounting of a stationary sensor element and/or an electronic evaluation unit on the housing part or the additional housing part.

The step 530 of mounting may include an insertion or attachment of the stationary sensor element and/or the electronic evaluation unit on or in one of the housing parts. The method 500 also features a step 540 of arranging the housing part and the additional housing part against each other. Thereby, the additional housing part abuts the joining area of the housing part, and the housing part and the additional housing part enclose a receiving space for the stationary sensor element and/or the electronic evaluation unit. The method 500 also features a step 550 of the joining together of the housing part and the additional housing part at the joining area by means of a joining process. The method 500 finally features a step 560 of the mounting of a movable sensor element on the housing part. Under the application of the method in accordance with the embodiment of this invention shown in FIG. 6, a sensor, such as the sensor from FIG. 2, may be advantageously produced.

Below, with reference to FIGS. 2 to 6, one embodiment of this invention is described in summary. The housing 300 of the sensor 210 and/or the position sensor consists of at least two housing parts 220, 230, which are tightly connected to each other. Thereby, the production of the sensor 210 and/or the housing 300 may be achieved in a manner that is as simple and cost-effective as possible. The two housing parts 220, 230 are connected to each other by means of laser welding. In doing so, the two housing parts 220, 230 are placed on top of each other, and a laser beam is applied from the housing part 220. In order for this to function, the housing part 220 is designed to be transmitting for the laser beams that are used, and the additional housing part 230 is designed to be absorbent for the laser beams that are used. Upon the connection of the two housing parts 220, 230 by means of laser welding, it is essential that the laser beam is adjusted in such a manner that there is a fusing of the joining surface 332 of the housing part 230 that absorbs the laser beams. In doing so, it is a prerequisite that the laser beam strikes along the joining surface 332 as much as possible with the same thickness, in order to achieve a fusing on the surface that is as consistent and uniform as possible.

As is shown in FIGS. 3 and 4, the housing 300 of the sensor 210 consists of the housing part 220 and/or a component with a guide rib 324 for the low-tolerance guiding of the movable sensor element 240 and/or the magnetic slide, and of the additional component 230.

The additional housing part 230 must be mounted on one side, which is opposite to the surface side 322 with the guide rib 324, of the joining area of the housing part 220. The laser beam is fed through the surface side 322 of the housing part 220 with the guide rib 324. Upon running the contours of the joining surface 332 of the additional housing part 230 over the surface side 322 of the housing part 220, a continuously formed guide rib would adversely affect the wall thickness of the housing part 220 required for the welding. Through the increased thickness of the housing part 220 at the location of such a guide rib, the intensity of the laser beam would possibly be weakened in such a manner that the laser beam is no longer able to provide energy to fuse the joining surface 332 of the additional housing part 230 at such location. Furthermore, the welding result would be negatively affected by reflections on, for example, vertical side walls of such a guide rib, which can lead to the same result that the joining surface 332 of the additional housing part 230 is not properly fused or is no longer fused.

Since, for reasons of tolerance compensation and a secure guidance of the movable sensor element 240 and/or of the magnetic slide, one guide rib is absolutely essential. A possibility is created through the guide rib 324 with the (for example) two gaps 325 for connecting the two housing parts 220 and 230 to each other in such a manner that the guide rib 324 can remain available. This is solved by the fact that the guide rib 324 is broken off in such a manner that, with the laser, a contour of the joining area 332 of the additional housing part 230 can be run over the surface side 322 of the housing part 220, such that the thickness of the housing part 220 in the joining area remains constant, and it is thus ensured that the two housing parts 220, 230 are connected to each other securely and tightly. With the laser, the contour of the joining area 332 of the additional housing part 230 may be run on the surface side 322 of the housing part 220, without the guide rib 324 representing a hindrance and/or an interfering contour for the laser beam, or the laser beam being weakened. Thus, a fusing of the joining surface 332 of the additional housing part 230 may take place below the guide rib 324 securely and reliably.

The embodiments described and shown in the figures are only selected as examples. Different embodiments may be combined with each other, completely or in reference to individual characteristics. Moreover, one embodiment may be supplemented by the characteristics of another embodiment.

The invention claimed is:

1. A housing part for a sensor housing, such as a housing for a vehicle transmission sensor, the housing part connectable to an additional housing part that abuts against the housing part along a joining area by a transmission welding process to define the sensor housing, wherein the housing part closes an open receiving space in the additional housing part where a stationary sensor element is disposed, the housing part comprising:
   a section that defines the joining area on an underside of the housing part where the abutting additional housing part is weldable to the housing part, the section having optical properties or material thickness so as to have a constant permeability for radiation along the joining area such that a constant intensity radiation is able to be emitted along the joining area to produce a uniform weld with the additional housing part along the joining area; and
   a guide rib defined on a planar surface of an upper side of the housing part, and a guide section defined along a side of the planar surface, the guide section and the guide rib extending along a common guide axis and defining a movement path for a movable sensor element along the housing part.

2. The housing part as in claim 1, wherein the housing part has a uniform thickness along an entirety of the joining area.

3. The housing part as in claim 1, wherein the housing part has at least two areas with different thicknesses along the joining area, the areas with different thicknesses made of materials with different optical properties such that the constant intensity radiation produces a uniform weld along all areas of the joining area.

4. The housing part as in claim 1, wherein the guide rib defined on the planar surface of the housing part extends is a direction that traverses the joining area, the guide rib comprising a gap therein at the traversal point with the joining area such that the joining area has a uniform thickness along an entirety of the joining area.

5. A housing for a sensor, such as a vehicle transmission sensor, the housing comprising:
   a housing part and an additional housing part;
   the housing part connected to the additional housing part by a transmission welding process along a joining area, wherein the additional housing part comprises an open receiving space therein for receipt of a stationary sensor element and abuts against an underside of the housing part along the joining area such that the housing part closes off the receiving space;
   the joining area along the housing part having optical properties or material thickness so as to have constant permeability for radiation along the joining area such that a constant intensity radiation along the joining area produces a uniform weld between the housing part and the additional housing part along the joining area; and
   a guide rib defined on a planar surface of an upper side of the housing part, and a guide section defined along a side of the planar surface, the guide section and the guide rib extending along a common guide axis and defining a movement path for a movable sensor element along the housing part.

6. The housing as in claim 5, wherein the housing part is formed of a material that is transmits the constant intensity radiation, and the additional housing part is formed of a material that absorbs the constant intensity radiation such that the housing part and additional housing part are welded together by radiation applied through the housing part to the additional housing part along the joining area.

7. A sensor, such as a sensor for a vehicle transmission, comprising:
   the housing of claim 5;
   a stationary sensor element;
   a movable sensor element;
   the stationary sensor element arranged in the receiving space; and
   the movable sensor element movably mounted on the housing part and engaged with the guide rib and guide section.

8. The sensor as in claim 7, further comprising an electronic evaluation unit also arranged in the receiving space, the additional housing part having an external electrical contact device in communication with the electronic evaluation device.

9. A method for production of a sensor, such as a sensor for a vehicle transmission, the method comprising:
   providing the housing of claim 5;
   mounting one or both of a stationary sensor element and an electronic evaluation unit in the receiving space defined by the housing part and the additional housing part;
   arranging the housing part and the additional housing part to abut along the joining area and the joining surface;
   welding the housing part and the additional housing part together by a transmission welding process wherein a constant intensity radiation is applied along the joining area of the housing part and absorbed by the joining surface of the additional housing part; and
   mounting a movable sensor element on the housing part so as to engage the guide rib and guide section.

10. The method as in claim 9, wherein the welding is done by a laser welder.

* * * * *